US006181918B1

(12) United States Patent
Benveniste

(10) Patent No.: US 6,181,918 B1
(45) Date of Patent: Jan. 30, 2001

(54) SYSTEM AND METHOD FOR MANAGEMENT OF NEIGHBOR-CHANNEL INTERFERENCE WITH CELLULAR REUSE PARTITIONING

(75) Inventor: Mathilde Benveniste, South Orange, NJ (US)

(73) Assignee: AT&T Corp, New York, NY (US)

( * ) Notice: Under 35 U.S.C. 154(b), the term of this patent shall be extended for 0 days.

(21) Appl. No.: 08/580,568

(22) Filed: Dec. 29, 1995

(51) Int. Cl.⁷ .................................................... H04B 1/10
(52) U.S. Cl. ............................................... 455/63; 455/450
(58) Field of Search ................................. 455/33.1, 33.3, 455/33.4, 54.1, 56.1, 63, 34.1, 422, 432, 447, 449, 452, 453, 450, 517, 524

(56) References Cited

U.S. PATENT DOCUMENTS

| 5,247,699 | * | 9/1993 | Hartman ............................. 455/33.3 |
| 5,404,574 | * | 4/1995 | Benveniste ............................. 455/63 |
| 5,428,818 | * | 6/1995 | Meidan et al. ........................ 455/34.1 |
| 5,430,761 | * | 7/1995 | Bruckert et al. ......................... 455/63 |
| 5,448,751 | | 9/1995 | Takenaka et al. . |
| 5,459,759 | * | 10/1995 | Schilling ............................. 455/33.1 |
| 5,548,812 | * | 8/1996 | Padovani et al. .................... 455/56.1 |

FOREIGN PATENT DOCUMENTS

| 0297062 | 12/1988 | (EP) . |
| 0544095 | 6/1993 | (EP) . |
| 96116448 | 3/1999 | (EP) . |

OTHER PUBLICATIONS

S. W. Halpern "Reuse Partitioning in Cellular Systems" 33$^{rd}$ IEEE Vehicular Technology conference, Toronto, Ont., Canada, May 25–27, 1983, pp. 322–327, XP002096008, 1983, New York, NY, USA, IEEE, USA, the whole document, and figure 5, cited as particularly relevant if taken alone as to claims 1–3, 5–7, 9, 10 and 12 in European Search Report dated Mar. 29, 1909 for European Patent Application No. 9611648.

Krister Sallberg, Bengt Stavenow and Berth Eklundh, "Hybrid Channel Assignment And Reuse Partitioning In A Cellular Mobile Telephone System," 37th IEEE Vehicular Technology Conference, pp. 405–441, Jun. 1, 1987.*

* cited by examiner

Primary Examiner—Nguyen Vo
Assistant Examiner—Sam Bhattacharya

(57) ABSTRACT

A novel methodology is provided for managing neighbor channel interference in a cellular wireless communications system as a function of a service-quality factor for a communications channel within such a system. That methodology is characterized as Re-Use Partitioning with Neighbor-Channel Restrictions, and carries out the function of eliminating neighbor-channel interference between neighboring omni-directional cells.

14 Claims, 6 Drawing Sheets

SYSTEM AND METHOD FOR MANAGEMENT OF NEIGHBOR-CHANNEL INTERFERENCE WITH CELLULAR REUSE PARTITIONING

CROSS REDUCE TO RELATED APPLICATIONS

This application is related to U.S. patent application Ser. No. 08/580,570, entitled "System and Method For Managing Neighbor Channel Interference In Channelized Cellular Systems" (M. BENVENISTE-7), and U.S. patent application Ser. No. 08/580,568, entitled "System and Method For Management of Neighbor Channel Interference With Power Control And Directed Channel Assignment", (M. BENVENISTE-9), said related applications being concurrently filed with the present application, having the same inventor, and being incorporated herein by reference.

BACKGROUND OF THE INVENTION

A. Field of the Invention

This application is related to wireless communications systems and more particularly to improved means for managing neighbor-channel interference in channelized cellular systems.

B. Background Art

In the art of wireless communications, considerations of spectral efficiency and maximization of available channels generally dictate the use of a cellular arrangement of such channels and the frequencies from which they are derived—i.e., a service area is partitioned into connected service domains known as cells. Within a particular cell, users communicate via radio links with a base station serving that cell, that base station being connected to base stations for other cells comprising a wireless communications network. That wireless communications network will, in turn, ordinarily be connected with one or more wired networks. To communicate using such a wireless network, each user is assigned one of a discrete set of channels.

A conventional regular hexagonal cell layout of a wireless cellular communications system is shown in schematic form in FIG. 1. Hexagonal cell layouts are shown because they approach a circular shape which is more akin to ideal power coverage for a cell. Circular service area shapes imply gaps and overlaps between cells which the hexagonal shape avoids. As is known, depicting the geographical service area in terms of a hexagonal grid establishes a geometric pattern that permits frequencies to be assigned in a patterned disposition allowing the reuse of those frequencies in a controlled repeatable regular assignment model. The cell areas each have specific channel sets assigned to them. These assignments may be non-fixed within a cell. Each channel set comprises a plurality of individual transmit and receive radio channels for use within the cell area. In the model shown in FIG. 1, cells marked "A" are co-user cells and all use the same channel set. The same is true for co-user cells marked "B", "C" etc., each of which has its own assigned channel set.

Each cell is radiated by an antenna system associated with a base station, which base stations may be interconnected with each other and/or with other networks. An omni-directional radiation pattern is depicted by antenna 104 and a directional antenna pattern, representing sectorization of cells into smaller wedge type service areas, is represented by antenna 102.

It is well known that a central aspect of cellular communications systems is the concept of frequency reuse. With frequency reuse, users in different geographical locations (different cells) may simultaneously use the same frequency channel, as depicted by commonly named cells in FIG. 1 for regular channel assignment. While frequency reuse can substantially increase spectral efficiency of a system, serious interference can occur between cells involved in the common use of the same channel in the absence of proper system design.

Frequency reuse assignments are generally implemented through the adoption of simple rules for identifying co-user cells and for partitioning the RF spectrum into channel sets. Channel assignment approaches can be broadly classified into two categories: fixed and flexible [See, M. Benveniste, "Self Configurable Wireless Systems", forthcoming]. Fixed channel assignment fixes the relationship between cells and the channels serving them. Only the channels allocated to a cell can serve calls in that cell, and each channel can be used simultaneously by all the cells to which the channel is assigned. An example of fixed channel assignment is "regular" channel assignment, which is characterized by equally-sized, regularly-spaced cells. Regular channel assignment is optimal for a system with traffic distributed uniformly across cells.

When the traffic distribution is not uniform, an optimal fixed "non-regular" channel allocation can be found, which allocates channels to cells according to their traffic load. [A process for achieving such an optimal non-regular allocation is described in M. Benveniste, "Apparatus and Method for Non-Regular Channel Assignment in Wireless Communication Networks", U.S. Pat. No. 5,404,574.]

Flexible channel assignment methods exploit the capability of a system for remote, software-driven, retuning of the base station radios, which capability enables channel capacity to adapt to traffic variation. The class of flexible channel assignment methodologies includes adaptive and dynamic channel assignment methods, and a hybrid of the two, adaptive-dynamic channel assignment [See, M. Benveniste, "Self Configurable Wireless Systems", id].

It is also well known that the quality of communication in wireless systems depends substantially on the ratio of the received signal to interference (S/I). The primary interference of concern consists of two components: co-channel interference and neighbor-channel interference. Co-channel interference is the interference from communication sources tuned to the same frequency as the operating channel. Neighbor-channel interference comes from communication sources using channels near the operating channel in the frequency spectrum. When the interfering neighbor channel is adjacent to the operating channel in the spectrum, the term adjacent-channel interference is generally used. To achieve the desired voice or data transmission quality, the ratio of the received signal over the combined co-channel and neighbor-channel interference must be above a specified threshold.

The need to avoid using neighbor channels within a cell and in neighbor cells has been well-recognized. In conventional channel assignment in analog AMPS systems, where three-sector cells re-use the spectrum in clusters of 7 cells, the spacing of 21 channels (630 kHz) between channels serving the same cell—as illustrated generally by the sectorized pattern of FIG. 2—has been more than adequate to render negligible any interference from neighbor channels. For physically contiguous cells, it is sufficient to avoid the assignment of adjacent channel sets to sectors of the same cell, or to sectors in such contiguous cells which would be contiguous to the sector under consideration. As can be seen in FIG. 2, such a channel assignment exists for the three-sector re-use group of size 7.

As less conventional channel assignment approaches, like flexible or non-regular fixed channel assignment, are pursued, however, such near automatic satisfaction of channel spacing requirements no longer occurs. There the cellular system designer faces the question: what is the minimum spectrum separation required between channels used simultaneously in a cell, or in neighboring cells. The approaches which have been proposed for answering this question do not consider neighbor-channel interference adequately, if at all. In particular, prior treatment of neighbor-channel interference, and the derivation of channel spacing requirements, has not considered the overall impact on the S/I ratio [See: W. C. Y. Lee, *Mobile Cellular Telecommunications Systems*, McGraw-Hill, New York, 1989]. Such failure to consider the impact of neighbor-channel interference on the S/I ratio will result in a signal that is weaker than the interference. By balancing the relative strength of an interfering signal located near the receiver with the signal strength drop caused by channel separation, the resulting S/I ratio would be equal to 1 (0 dB) in the absence of co-channel interference. If some co-channel interference were present, the resulting S/I ratio would be less than 1 (negative, when expressed in dB).

Since the S/I requirement implies a restriction on total interference, and total interference is the sum of two terms (co-channel plus neighbor-channel interference), there is a trade-off between them. Neighbor-channel interference decreases when there is a larger frequency-spectrum separation between channels, thus leaving a greater margin for co-channel interference. A lesser re-use distance is thus allowed, and the system capacity is higher, at least in principle. A larger channel separation, however, makes fewer channels available in each cell, which would lead to a capacity decrease if everything else stayed the same. Thus an important objective of the system designer would be a determination of the optimal channel separation for which the S/I requirement is met, and spectrum utilization is maximum.

SUMMARY OF THE INVENTION

This invention provides a novel methodology for managing neighbor channel interference in a cellular wireless communications system as a function of a service-quality factor for a communications channel within such a system. The novel methodology for managing neighbor-channel interference which is disclosed herein is characterized as:

Re-Use Partitioning with Neighbor-Channel Restrictions—for eliminating neighbor-channel interference between neighboring omni-directional cells

DETAILED DESCRIPTION

The discussion following will be presented partly in terms of algorithms and symbolic representations of operations on data within a computer system. As will be understood, these algorithmic descriptions and representations are a means ordinarily used by those skilled in the systems engineering arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

For clarity of explanation, an illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, some or all of the functions of the "OMC", "MSCs", and "BSs" presented in FIGS. 3 and 4, as well as the "Computer Processor" of FIG. 4, may be provided by one or more processors, including shared processors. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 1:
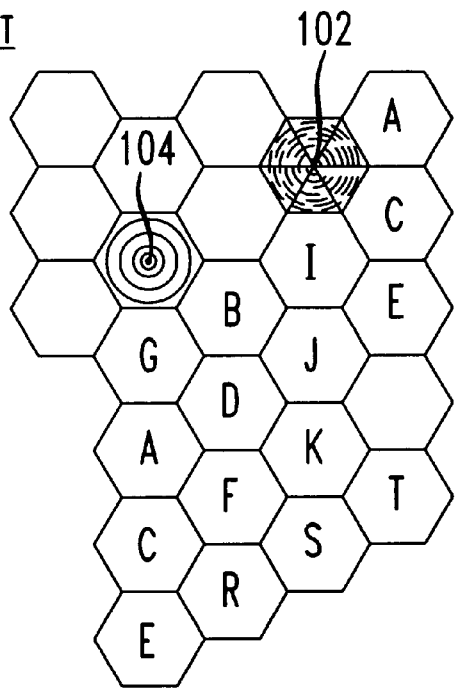
FIG. 1 depicts a schematic diagram of a regular cell layout for a wireless cellular communications system.
Figure 2:
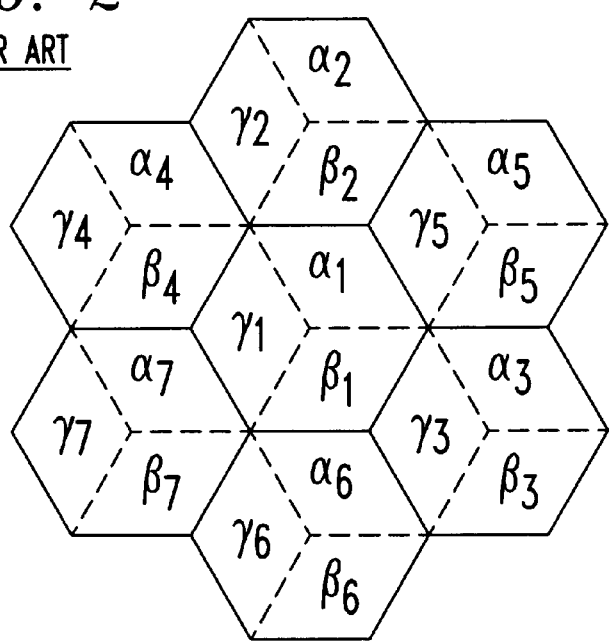
FIG. 2 depicts a sectorized cell arrangement based on a re-use factor of 7.
Figure 3:
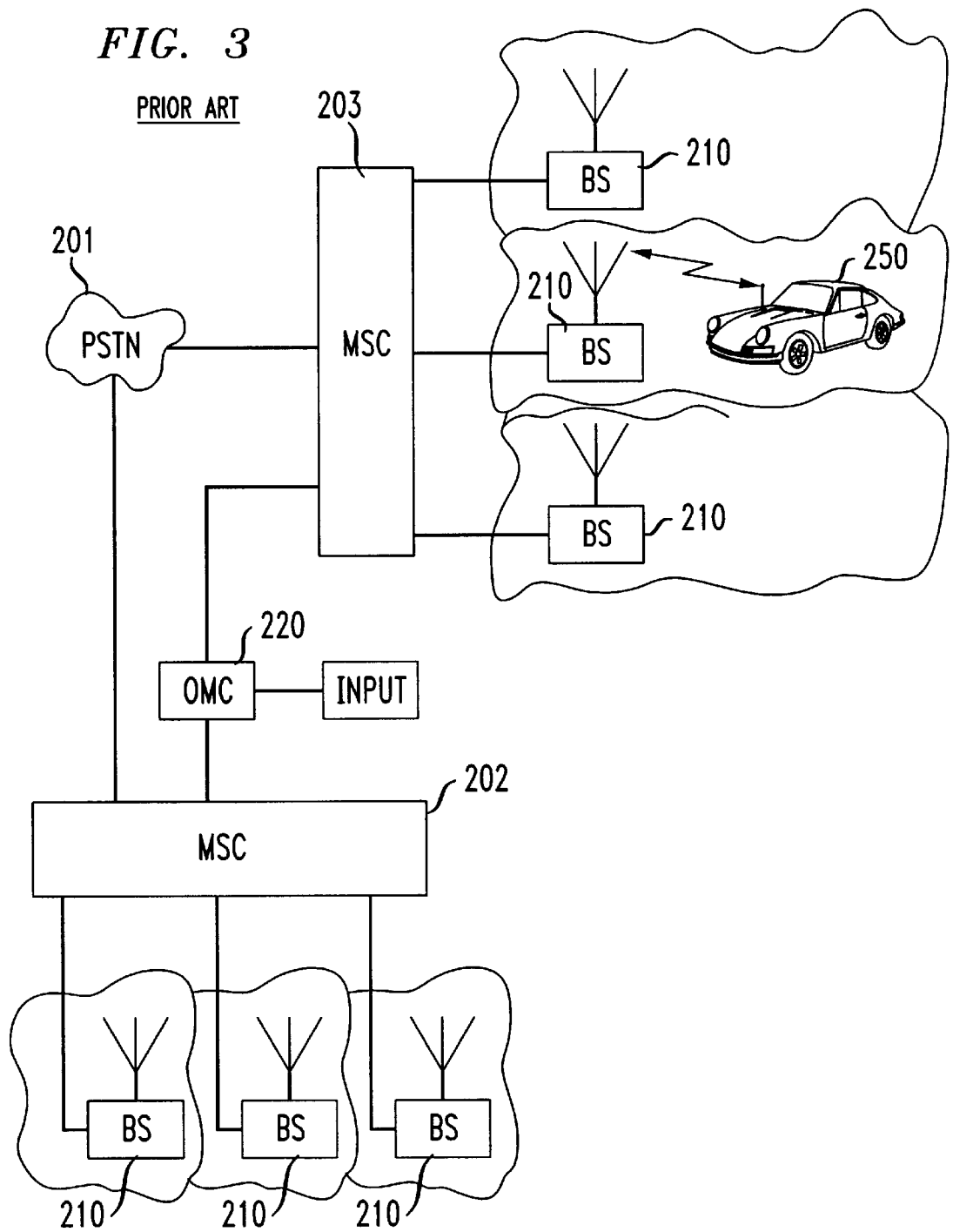
FIG. 3 shows in block diagram form the major elements of a wireless cellular communications system and the typical interconnections among such elements.

A typical cellular system is shown in the block diagram of FIG. 3. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radio telephoned 250 within its cell coverage area.

An operation and management center (OMC) 220 is coupled to the MSCs 202 and 203 to control their system operation and their associated BSs 210. OMC 220 is a central control station which includes data processing and input for accepting data input from data storage and real time control. In the case of flexible channel assignment, this data processing arrangement may be utilized in implementing channel arrangements in combination with remotely tunable radio transceivers located at the BSs.

Figure 4:
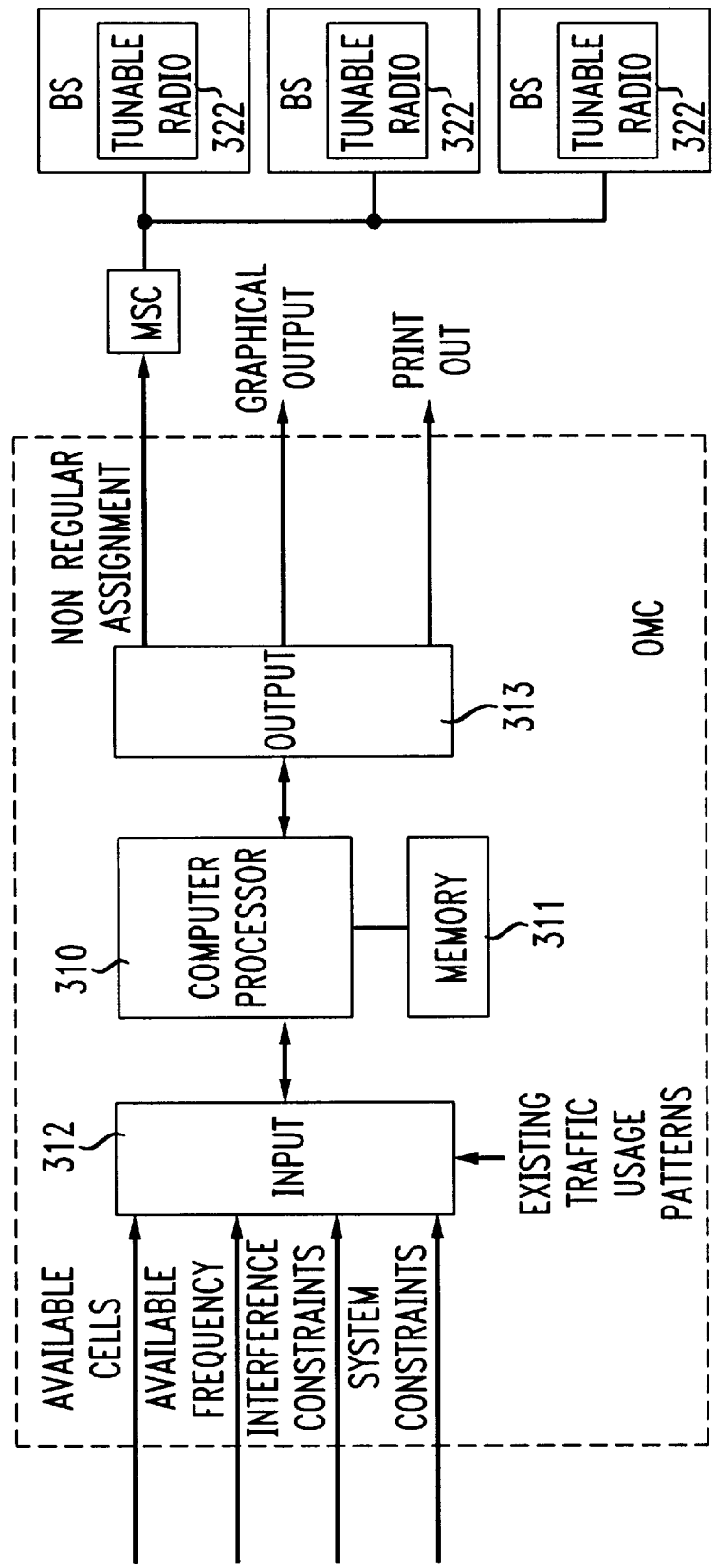
FIG. 4 shows a schematic block diagram of a data processing system for controlling the assignment of radio channels to various cells of a wireless cellular communications system using a flexible channel assignment methodology.

For such a flexible channel assignment case, an illustrative embodiment of data processing equipment included in the OMC for controlling the assignment and tuning of radio transceivers at the BSs is shown in schematic block diagram form in FIG. 4. A Computer Processor 310 has a stored program included in an associated Memory 311. This program may include instructions for performing the assignment of radio channels to a cellular system. Initial input data is supplied through the Input function 312 to the Computer Processor 310. Inputs include: the available cells, available radio frequencies, and interference information, usually in the form of a cell-to-cell interference matrix which defines the interference to each cell from every other cell. Further inputs include system constraints necessary for the desired channel assignment and traffic usage patterns.

To implement a flexible channel assignment methodology, the channel assignment process will be performed by Computer Processor 310 according to the instructions contained in Memory 311. The resulting channel assignments may be output via the Output function 313 to the MSC 315, from which they may be forwarded to the BSs 321. The individual tunable radios 322 included in the BSs may then be tuned to the proper frequencies in accord with the assignment of radio channels determined by the assignment process.

I. METHODOLOGY OF INVENTION

A. GENERAL

The level of interference contributed by neighbor channel transmitters depends on the position of the subscriber units (generally, mobile or portable) relative to their base station (s), the level of power control exercised, and the direction of communication—i.e., whether transmission occurs from the base station to the subscriber unit (referred to herein as "down link"), or from the subscriber unit to the base station (referred to herein as "up link"). FIGS. 5 and 6 illustrate exemplary configurations for consideration of the impact of neighbor-channel interference. FIG. 5 illustrates a single cell with base station B, while in FIG. 6, two neighboring cells are illustrated, with base stations $B_1$ and $B_2$. In both figures, subscriber stations i and j are shown juxtaposed in various configurations relative to one another and to the base station (s). In all configurations the designation i indicates the serving subscriber unit, and the designation j indicates the subscriber unit operating on the nearest channel in the frequency spectrum, referred to as the neighbor channel. In the configurations of FIG. 6, serving subscriber unit i is served by base station $B_1$ and neighbor-channel subscriber unit j is served by base station $B_2$.

Figure 5A:
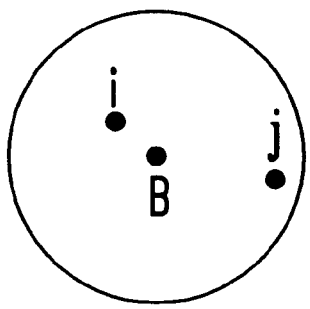
FIG. 5 illustrates schematically a single cell including its base station, with a served subscriber station and a potentially interfering subscriber station juxtaposed at various positions relative to each other and to the base station.
Figure 5B:
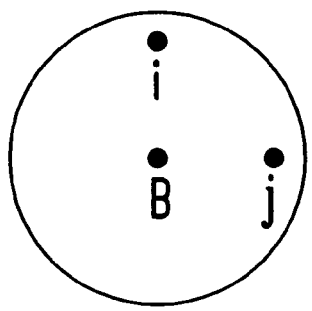
Figure 5C:
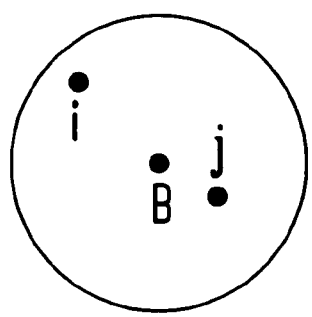

As an illustrative case, consider that all calls are served with equal power—i.e., no power control. Accordingly, down link neighbor-channel interference will be comparable in all the cases illustrated in FIG. 5 since all calls are served with the same power. The up link neighbor-channel interference, however, will be different in the three cases illustrated in FIG. 5. Because of signal attenuation as distance increases between transmitter and receiver, the signal strength received from subscriber unit i in FIG. 5(a) is stronger (due to its proximity to the serving base station) than the interfering signal from subscriber unit j. Hence up-link neighbor-channel interference for this configuration will be negligible. In the configuration of FIG. 5(b) the received serving signal is comparable to the interfering signal since the two subscriber units are the same distance from the base station. Finally, in the configuration of FIG. 5(c), up-link neighbor-channel interference is high because the interfering subscriber unit is closer to the base station than the serving subscriber unit.

If power control is used to reduce the power of calls closer to the base station, the experienced neighbor-channel interference changes. These changes can be illustrated by again considering the configurations of FIG. 5 and now assuming that power is adjusted so as to equalize the received serving signals. Then, up-link neighbor-channel interference would be comparable in all three configurations of FIG. 5 because the signal received from all subscriber units is the same, regardless of position of the unit relative to the base station. On the other hand, with down-link power control applied, neighbor-channel interference will be different for each of the three configurations. Power control causes down-link neighbor-channel interference to increase in FIG. 5(a) since the power of the interfering signal is higher than that of the serving signal. Power control does not alter down-link neighbor-channel interference in the configuration of FIG. 5(b), since both the served and neighbor-channel subscriber units are equidistant from the base station. However, in the configuration of FIG. 5(c), power control will causes down-link neighbor-channel interference to decrease. Thus, as can be seen, power control is generally beneficial in the up-link direction, but can often result in increased neighbor-channel interference when used in the down-link direction.

Figure 6A:
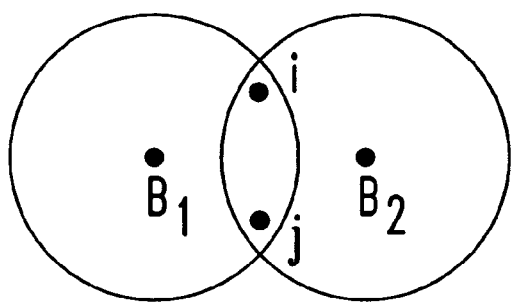
FIG. 6 illustrates schematically two neighboring cells, each with a base station, and with a served subscriber station and a potentially interfering subscriber station juxtaposed at various positions relative to each other and to the base stations.
Figure 6B:
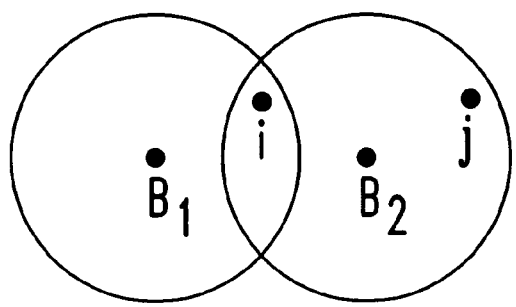
Figure 6C:
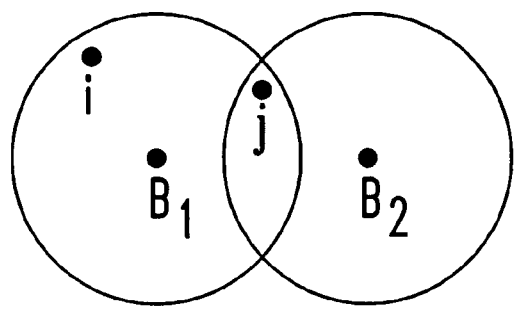

In the neighboring cells case shown in FIG. 6, and considering first the configuration of FIG. 6(a), subscriber unit i will experience neighbor-channel interference on both the down link (due to the competing signal from base station $B_2$) and the up link (due to the competing signal from subscriber station j). As will readily be seen from the figures, comparable neighbor-channel interference will be experienced on the down link in FIG. 6(b) and on the up link in FIG. 6(c), but the neighbor-channel interference will be negligible on the up link in FIG. 6(b) and on the down link in FIG. 6(c).

In the companion cross-referenced case designated as M. Benveniste-7 (Ser. No. 08/580,570 certain relationships were developed among channel separation (between a serving channel and an interfering neighbor channel), received signal strength for serving and for interfering channels and the S/I ratio. Those relationships were then applied for an illustrative wireless communications application to develop two tables relating the realized S/I ratio and channel separation for various levels of comparative signal strength between a serving and an interfering signal. Those tables, which provide a useful reference for certain of the descriptive materials following, are reproduced below and can be characterized as follows:

Table 1 provides a trade-off between the S/I ratio realized by a served subscriber, T, and channel spacing, w, based on a design co-channel S/I threshold of 18 dB. As will be seen the first column represents the channel spacing given in multiples of the channel bandwidth, while the remaining ten columns give the realized S/I ratio (in dB) for a served subscriber, for different values of a ratio of signal strengths (in dB) for an interfering to a serving signal, P, as experienced by the subscriber.

Similarly, Table 2 provides, for different channel spacing values w, the design co-channel S/I ratio, $T_c$, needed to achieve a target overall S/I ratio, T—i.e. a trade-off between $T_c$ and w for dB(T) equal to 18 dB.

TABLE 1

Trade-off between channel spacing and S/I ratio dB(T)

$dB(T_c) = 18$

| Channel Spacing | dB(P) | | | | | | | | | |
|---|---|---|---|---|---|---|---|---|---|---|
| w | −20 | −15 | −10 | −5 | 0 | 4 | 14 | 20 | 28 | 40 |
| 1 | 17.98 | 17.93 | 17.79 | 17.36 | 16.23 | 14.46 | 6.66 | 0.90 | −7.02 | −19.01 |
| 2 | 18.00 | 18.00 | 18.00 | 18.00 | 17.99 | 17.98 | 17.79 | 17.21 | 14.46 | 4.78 |
| 3 | 18.00 | 18.00 | 18.00 | 18.00 | 18.00 | 18.00 | 17.99 | 17.97 | 17.79 | 15.47 |
| 4 | 18.00 | 18.00 | 18.00 | 18.00 | 18.00 | 18.00 | 18.00 | 18.00 | 17.98 | 17.67 |
| 5 | 18.00 | 18.00 | 18.00 | 18.00 | 18.00 | 18.00 | 18.00 | 18.00 | 18.00 | 17.94 |

TABLE 2

Trade-off between channel spacing and co-channel S/I ratio $dB(T_c)$ $dB(T) = 18$

| Channel Spacing | dB(P) | | | | | | | | | |
|---|---|---|---|---|---|---|---|---|---|---|
| w | −20 | −15 | −10 | −5 | 0 | 4 | 14 | 20 | 28 | 40 |
| 1 | 18.02 | 18.07 | 18.22 | 18.75 | 21.03 | NA | NA | NA | NA | NA |
| 2 | 18.00 | 18.00 | 18.00 | 18.00 | 18.01 | 18.02 | 18.22 | 18.97 | NA | NA |
| 3 | 18.00 | 18.00 | 18.00 | 18.00 | 18.00 | 18.00 | 18.01 | 18.03 | 18.22 | 24.76 |
| 4 | 18.00 | 18.00 | 18.00 | 18.00 | 18.00 | 18.00 | 18.00 | 18.00 | 18.02 | 18.36 |
| 5 | 18.00 | 18.00 | 18.00 | 18.00 | 18.00 | 18.00 | 18.00 | 18.00 | 18.00 | 18.06 |

As noted earlier, in the case of no power control being applied and both subscriber units i and j being served by the same base station (i.e., the configuration of FIG. 5), the down-link interfering and serving signals will be comparable, because of the equal power with which each signal is transmitted from the base station. Thus, the ratio of the interfering signal to the serving signal, P, is equal to 1 and dB(P) is equal to 0. As will be seen from Table 1, if adjacent channel use were allowed, the S/I ratio would drop to 16.23 dB, which represents 67 percent of the target value of 63.1 (18 dB). Setting channel spacing w equal to 2 is sufficient to reclaim most of the S/I drop caused by neighbor-channel interference—an S/I ratio increase from 16.23 to 17.99 dB.

A comparable condition occurs when subscriber units i and j are served by different base stations if the serving subscriber unit i is near the common boundary between the two cells, regardless of the position of the interfering subscriber unit j, as illustrated in FIGS. 6(a) and 6(b). However, if subscriber unit i is further away from the interfering base station B2 than from its serving base station $B_1$, as illustrated in FIG. 6(c), the P ratio will be less than 1, and dB(P) becomes negative. Thus the impact of adjacent channel use on the S/I ratio is less. For instance, at a dB(P) value of −5 dB, Table 1 shows that the realized S/I ratio will be 17.36 dB, which represents 86 percent of the design co-channel S/I ratio of 18 dB. For dB(P) equal to −10 dB, a 17.79 dB S/I ratio is realized, which represents 95 percent of the design co-channel S/I ratio. Alternatively, this can be characterized as the value realized by the S/I ratio if neighbor-channel interference is limited to 5 percent of the combined co-channel plus neighbor-channel interference. Accordingly, a value of P may be defined for which adjacent-channel interference becomes acceptable. That defined value is designated herein as $P_a$ and in the exemplary case described is equal to −10 dB.

Considering the trade-off between w and $T_c$ in Table 2, for the case of dB(P)=0, it can be seen that increasing the channel spacing from 1 to 2 would allow one to plan for a co-channel S/I ratio of 18.01 dB, instead of 21.03 dB. Additionally, it will be seen that, if the spacing were increased above 2, one would gain little in terms of the co-channel interference bound and, hence, in terms of capacity.

For the power control case, it has been shown that power control on the down link exacerbates the impact of neighbor-channel interference. Consider the particular case of power control being applied on the down link to reduce the signal strength of subscriber units closer in. In this case, P would be equal to the difference in power reduction of the signals serving the two subscriber units. The worst case occurs when the power of the signal serving subscriber unit i is reduced substantially, and the serving subscriber unit j operates at maximum power, as is illustrated by the configuration of FIG. 5(a). Table 1 shows that, even though the design co-channel S/I ratio is 18 dB, the realized S/I ratio becomes negative when down-link power is reduced by 28 dB for the near-end subscriber unit. It takes a channel spacing of 3 to achieve a 17.79 dB S/I ratio.

In the companion cross referenced application designated M.BENVENISTE-9, a novel Mixed Power Control Methodology is disclosed which will permit the partial use of down-link power control without increasing channel spacing beyond the value of 2, while still maintaining a reasonable S/I ratio.

B. NEIGHBOR-CHANNEL INTERFERENCE MANAGEMENT

B1. Re-use Partitioning With Adjacent Channel Restrictions

It was shown previously that, whenever P (ratio of signal strengths for an interfering to a serving signal) is lower than a threshold value $P_a$, adjacent-channel interference is below a specified level. If this level is low, it can be said that, practically speaking, there is no adjacent-channel interference. Given this relationship, it is shown—here that, with the application of the mixed power control method disclosed in the companion application designated Benveniste-9 (Ser. No. 08/581,694), there is a region inside a cell where a subscriber unit will not experience down-link adjacent-channel interference from, or cause up-link adjacent-channel interference to, subscriber units in neighboring cells. Therefore, in order to avoid adjacent-channel interference from neighboring cells, it is sufficient to avoid adjacent channel use by subscriber units outside the noninterference region of neighboring cells. After this region has been identified, it is shown how adjacent-channel interference can be met at a capacity gain relative to that otherwise attainable.

(a) No adjacent-channel-interference region

Figure 7:
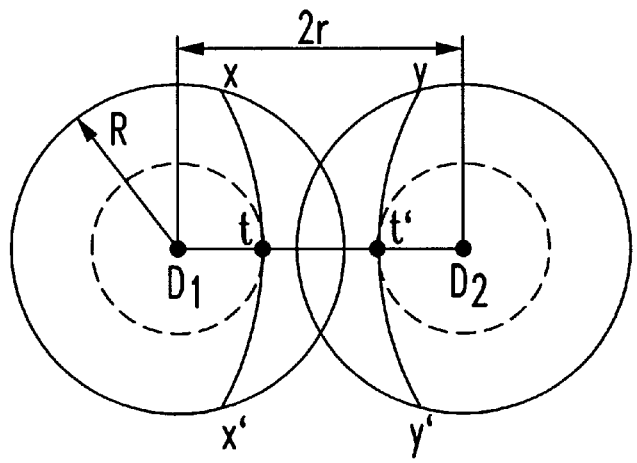
FIG. 7 depicts an application of the Re-Use Partitioning With Neighbor-Channel Restrictions methodology of the invention.

As an illustrative example of the method of this embodiment of the invention, consider two equal-size cells 1 and 2 served by base stations $B_1$ and $B_2$, respectively, as illustrated in FIG. 7. For this illustrative case, power control is not used on the down link. In a related article [M. Benveniste, "Managing Neighbor Channel Interference in Channelized Cellular Systems," forthcoming], the inventor has shown that for a pair of subscriber units in neighboring cells, whether a subscriber unit experiences down-link adjacent-channel interference from a neighbor cell depends only on its own position, and not on the position of the subscriber units in the neighbor cell. Specifically, in the case where loglinear propagation loss with distance can be assumed, a subscriber unit will not experience down-link adjacent-channel interference from a subscriber unit in a neighboring cell when:

$$P = \left[\frac{m_1}{n_1}\right]^\gamma \leq P_a \quad (8)$$

where $m_1$ and $n_1$ are respectively the distances of the served subscriber unit from its own, and from the neighbor cell's base station and γ is a propagation loss coefficient.

As shown in FIG. 7, one can draw a contour XX' to the left of which there is no adjacent-channel interference experienced in cell 1 from adjacent channels used in cell 2. Let l be the shortest distance of contour XX' from $B_1$. If cell 1 were surrounded by neighbor cells that use adjacent channels, there would be a circle of radius l, inside which a subscriber unit would remain unaffected by adjacent-channel interference on the down link. l can be computed from equation 8 as follows:

$$P = \left[\frac{l}{2r-l}\right]^\gamma = P_a \quad (9)$$

where 2r is the distance between the base stations. If 2r is equal to √3R, where R is the cell radius, then $$l = \frac{\sqrt{3}\,R}{1 + P_a^{-1/\gamma}} \quad (10)$$

For instance, if $P_a$ is equal to 0.1 (dB(P)=−10), and γ is equal to 4, l would be equal to 0.6234 R.

In the inventor's referenced article, similar relations are developed for no power control on the down link and full power control on the up link. In particular, it is shown that for the up-link with power control applied, adjacent-channel interference will not be incurred when:

$$P = \left[\frac{m_2}{n_2}\right]^\gamma \leq P_a$$

where $m_2$ and $n_2$ are respectively the distances of the subscriber unit served by base station number 2 (as depicted in FIG. 7) from that base station and from base station number 1.

From this relationship, with the use of full power control on the up link, there is a boundary YY', a distance l' from base station $B_2$, to the right of which subscriber units in cell 2 cannot cause significant adjacent-channel interference to cell 1. Subscriber units inside the circle of radius l' would not cause up-link adjacent-channel interference to a neighbor cell. In the inventor's article it is also shown, in the case where power control is selected to equalize received signal strength, that the down-link and up-link relations are equivalent, which ensures that YY' is a mirror image of XX', and l' is equal to l.

(b) Characteristics of Methodology

The adjacent-channel interference relationships discussed above can be distilled to the following two properties:

I. A subscriber unit within a radius l of its base station will not experience down-link adjacent-channel interference from neighbor cells, and II. The same subscriber unit will not cause up-link adjacent-channel interference to neighbor cells.

Based on these properties, adjacent-channel interference may be eliminated by imposing the following three conditions:

1. Two server groups should be established in each cell, one for subscriber units within a radius $l_I$, and another outside that radius. $l_I$ is less than or equal to l.
2. Adjacent channels are not allowed in any pair of outer and inner server groups.
3. Adjacent channels cannot be used by any two outer server groups that are assigned to abutting cells.

By Condition 2, outer server groups will not cause adjacent-channel interference to inner server groups, and vice versa. This, coupled with Properties I and II, ensures that the inner server groups will not cause adjacent-channel interference on one another. According to Property I, there is no adjacent-channel interference on the down link of an inner server group. Adjacent channel interference on the up link of the inner server group cannot be caused by another inner server group, by Property II; neither can it come from an outer server group because of Condition 2. Hence, an inner server group does not experience adjacent-channel interference.

By Condition 3, outer server groups will not cause adjacent-channel interference on other outer server groups. Since there is no adjacent-channel interference from the inner server groups, as a result of Condition 2, outer server groups will not experience adjacent-channel interference, either.

(c) Implementation of Methodology

Condition 2 can be satisfied by splitting the available spectrum into two connected non-overlapping segments: the lower frequency portion and the higher frequency portion. The channels in one of the segments are assigned to the inner server groups, and the channels in the other segment are assigned to the outer server groups. Hence, there are no adjacent channels between the inner and the outer server groups, except for the pair of channels where the spectrum is split. One of the two channels in the pair could be dropped if one wanted to eliminate totally the possibility of adjacent-channel interference.

In order to meet Condition 3, one must ensure that abutting cells do not use adjacent channels in their outer server groups. Accomplishment of this goal presents, in concept, a comparable level of difficulty as for solving the original channel assignment problem with adjacent channel restrictions. However, a significant advantage of the methodology of the invention lies in that, once such an assignment has been found— typically at a reduced capacity relative to solving the problem without adjacent channel restrictions—the capacity can be increased with re-use partitioning.

Re-use partitioning has been used to increase capacity in the absence of adjacent channel restrictions, by trading off higher S/I ratios enjoyed closer to the base station for a shorter re-use distance or, equivalently, a lower re-use factor [See S. W. Halpern, "Reuse partitioning in cellular systems", *Proceedings of the 33rd Vehicular Technology Conference*, pp. 322–327, May 1983]. When adjacent channel restrictions are imposed, the trade off becomes harder to achieve as lower reuse factors cannot satisfy these restrictions. The methodology of the invention shows how to circumvent this obstacle and thus achieve a higher capacity.

Finally, the limit l of the radius $l_I$ of the inner server group need not be restricted to produce a specified level of adjacent-channel interference that is considered negligible. The radius (and therefore higher adjacent-channel interference level) may be chosen so that it increases cell capacity, provided that the resulting total co-channel and adjacent-channel interference is acceptable.

(d) Application of Methodology

The methodology of the invention can be used with regular and non-regular fixed channel assignment, as well as flexible channel assignment. This section provides exemplary applications of that methodology, showing the capacity gain attainable by this method when used with fixed regular channel assignment.

N of (9,3)

Figure 8:
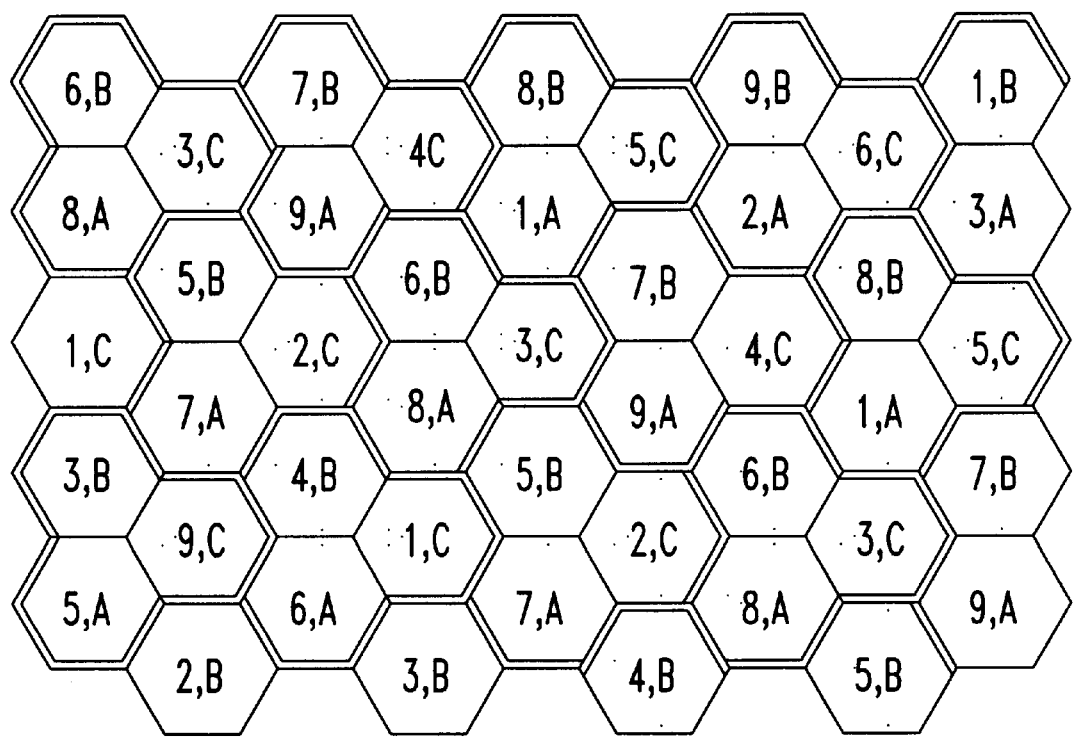
FIG. 8 shows a cell layout involving re-use partitioning according to the method of the invention.

Consider first an example where channel sets are constructed by the horizontal method. Hence, each channel set contains adjacent channels to the channel sets above and below it, with the last channel set being adjacent to the first. A re-use factor of 9 will be used for the outer server groups and a re-use factor of 3 for the inner server groups, as illustrated in FIG. 8. It was shown in the companion application designated Benveniste-7 (Ser. No. 08/580,570) that such a re-use cluster of size 9 has no adjacent edges, as required by Condition 3 above.

Capacity is measured as the offered load that can be carried by the available channels with a 2 percent blocking probability. Making the assumption that the traffic is distributed uniformly, the portion of the total traffic that would be located within the coverage area of the inner server group would be equal to $l_I^2/R^2$. That is, if $a_O$ is the capacity of an outer server group, and $a_I$ is the capacity of an inner server group, the following relationship must hold if traffic is distributed uniformly inside a circle of radius R.

$$\frac{l_I^2}{R^2} = \frac{a_I}{a_o + a_I} \tag{11}$$

Furthermore, by Condition 1, $$l_I \leq l \tag{12}$$

Now, consider that there are 399 channels available (as is the case with the present U.S. cellular communications system). If 324 of those channels are assigned to the 9 outer server groups (36 to each), and 75 channels are assigned to the 3 inner server groups (25 to each), the capacity of the outer groups $a_O$ would be 27.3 erlangs (from standard erlang tables, based on 2% blocking probability), and the capacity of the inner groups $a_I$ would be 17.5 erlangs. The total capacity per cell would be 44.8 erlangs, with 0.3906 of it carried by the inner server group. (See Table 3.) To be consistent with the uniform traffic distribution assumption, however, the inner server group radius $l_I$ would have to be 0.6250 R, by equation (11). The worst co-channel S/I ratio for the inner group would be realized a distance $l_I$ from the base station. It would be 18.7 dB. The $P_a$ value corresponding to this value of $l_I$ is −9.93 dB, by equation (9). Equation (3) gives the worst case S/I ratio realized in the inner circle; it is 18.45 dB. The worst-case S/I ratio for a subscriber unit in the outer server group is 19.6 dB. The S/I ratio is computed by summing the interference contribution of the six closest co-channel cells to a fixed point on the boundary of the service grups coverage area.

A higher S/I ratio could be realized by decreasing $l_I$ and re-distributing the available channels between the server groups, as seen in Table 4. If 333 channels are assigned to the 9 outer server groups (37 to each), and 66 channels are assigned to the 3 inner server groups (22 to each), the capacity of an outer server group would be 28.2 erlangs each, and that of the inner server group 14.9 erlangs. Of the total cell capacity of 43.1 erlangs, 0.35 lie in the inner server group. The uniform traffic distribution condition in equation (11) would be met if $l_I$ were equal to 0.588 R. The co-channel S/I ratio in the inner server group is 19.85 dB. The worst cast $P_a$ value is −11.56 dB, as computed by equation (9). Equation (3) gives the worst case S/I ratio realized in the inner circle; it is 19.62 dB. The outer server group still has a 19.6 dB worst-case S/I ratio.

TABLE 3

Re-use Partitioning (9,3) -- $l_1$ = 0.6250 R

| Server Group | S/I (dB) | Channels per Server Group | Channels Used | Capacity (erlangs) |
|---|---|---|---|---|
| Outer (N = 9) | 19.6 | 36 | 324 | 27.3 |
| Inner (N = 3) | 18.5 | 25 | 75 | 17.5 |
| Combined | 18.5 | 61 | 399 | 44.8 |

TABLE 4

Re-use Partitioning (9,3) -- $l_1$ = 0.588 R

| Server Group | S/I (dB) | Channels per Server Group | Channels Used | Capacity (erlangs) |
|---|---|---|---|---|
| Outer (N = 9) | 19.6 | 337 | 333 | 28.2 |
| Inner (N = 3) | 19.6 | 22 | 66 | 14.9 |
| Combined | 19.6 | 59 | 399 | 43.1 |

N of (8,3)

In this example the channel sets are constructed by the odd/even method. That is, half of the channel sets come from the first column of a two-column matrix and the other half come from the second column. A re-use factor of 8 will be used for the outer server groups, and a re-use factor of 3 for the inner server groups. Of the eight outer server channel sets, the pairs (1, 2), (3, 4), (5, 6), and (7, 8) contain adjacent channels. There would be no adjacent channels in the remaining pairs if the channels after the first, second, and third quarter of the spectrum were not used. It was shown in the companion application designated Benveniste-7 (Ser. No. 08/580,570) that the N of 8 re-use pattern with an odd/even channel set construction has no adjacent edges.

Of the 396 available channels, 312 are assigned to the 8 outer server groups (39 to each), and 84 are assigned to the 3 inner server groups (28 to each). An offered load $a_O$ of 30.1 erlangs can be carried by each outer server group with 2 percent blocking probability. With 28 channels each, the inner server groups can carry 20.2 erlangs each. By equation (11), $l_I$ would be 0.6337 R. Illustratively, consider a limiting of adjacent-channel interference by setting $P_a$ equal to −10 dB. Then, by equation (10), $l_I$ would be equal to 0.6234 R if γ equals 4. The load, $a_I$, of the inner server group would be equal to 19.1 erlangs, according to the uniform distribution assumption expressed by equation (11). The total capacity of a cell with this (8, 3) re-use partitioning scheme will 49.2 erlangs, as shown in Table 5. The S/I ratio in the outer group is 19.5 dB. In the inner group, the S/I ratio is 18.5 dB with co-channel S/I ratio equal to 18.7 dB. inner group.

TABLE 5

Re-use Partitioning (8,3) -- $l_1$ = 0.6234 R

| Server Group | S/I (dB) | Channels per Server Group | Channels Used | Capacity (erlangs) |
|---|---|---|---|---|
| Outer (N = 8) | 19.5 | 39 | 312 | 30.1 |
| Inner (N = 3) | 18.5 | 28 | 84 | 19.1 |
| Combined | 18.5 | 67 | 396 | 49.2 |

A higher S/I ratio, with lower capacity, can be attained by decreasing the area of the inner server group. The S/I ratio of the inner and the outer server groups can be equalized at 19.5 dB by making $l_I$ equal to 0.5918 R. By then assigning 40 channels to each of the 8 outer groups, and 25 channels to each inner group, the offered load that blocks with 2 percent probability will be 31 and 17.5 erlangs for each type of server group, respectively. To satisfy the uniform traffic distribution assumption in (11), $a_I$ is adjusted to be 16.7 erlangs. Hence, the combined capacity of the inner and the outer server groups will be 47.7 erlangs per cell, as seen in Table 6.

TABLE 6

Re-use Partitioning (8,3) -- $l_1$ = 0.5918 R

| Server Group | S/I (dB) | Channels per Server Group | Channels Used | Capacity (erlangs) |
|---|---|---|---|---|
| Outer (N = 8) | 19.5 | 40 | 320 | 31.0 |
| Inner (N = 3) | 19.5 | 25 | 75 | 16.7 |
| Combined | 19.5 | 65 | 395 | 47.7 |

II. CONCLUSION

Herein has been disclosed a novel methodology for managing neighbor-channel interference. This method can be employed with fixed and flexible, regular and non-regular channel assignment. And, it is applicable to all channelized systems whether they employ frequency-division multiple access or hybrid frequency-division/ time-division multiple access.

Although the present embodiment of the invention has been described in detail, it should be understood that various changes, alterations and substitutions can be made therein without departing from the spirit and scope of the invention as defined by the appended claims.

What is claimed is:

1. A method of managing interference in a wireless communications network having service areas partitioned into a plurality of cells, wherein a second plurality of communications channels are available for allocation among said cells, said method comprising the steps of:
    forming two server groups in each cell, an inner server group for mobile units within a radius l from a central transmitting site in said cell, and an outer server group for mobile units outside that radius;
    allocating said available channels among said server groups subject to the following constraints:
        adjacent channels are not permitted in any (outer or inner) server group; and
        adjacent channels cannot be used by any two outer server groups that are assigned to abutting cells.

2. The method of managing interference of claim 1 wherein said radius l is chosen such that a mobile unit inside that radius will not experience down-link adjacent channel interference from a neighboring cell.

3. The method of managing interference of claim 1 wherein said radius l is chosen such that a mobile unit inside that radius will not cause up-link adjacent channel interference to a mobile unit operating in a neighboring cell.

4. The method of managing interference of claim 1 wherein said radius l is defined by the relation:

$$l = \frac{\sqrt{3}\,R}{1 + P_a^{-1/\gamma}}$$

where $P_a$ is a predefined threshold value for a received signal strength ratio relating a served mobile unit and an interfering mobile unit, R is the cell radius and $\gamma$ is a propagation loss coefficient.

5. The method of managing interference of claim 1 wherein re-use partitioning is applied to provide a higher traffic handling capacity for a cell.

6. The method of managing interference of claim 5 wherein said radial distance l from said central transmitting site is adjusted to effect a tradeoff between a realized Signal to Interference (S/I) ratio and a traffic carrying capacity for said cell.

7. The method of managing interference of claim 5 wherein said outer server group is characterized by a re-use factor of 9 and said inner server group is characterized by a re-use factor of 3.

8. The method of managing interference of claim 5 wherein said outer server group is characterized by a re-use factor of 8 and said inner server group is characterized by a re-use factor of 3 and channel sets are constructed by an odd/even method.

9. The method of managing interference of claim 1 wherein said method is applied for regular fixed channel assignment.

10. The method of managing interference of claim 1 wherein said method is applied for non-regular fixed channel assignment.

11. The method of managing interference of claim 1 wherein said method is applied for dynamic channel assignment.

12. A storage means fabricated to contain a model for determining an allocation of a plurality of communications channels among a second plurality of cells in a wireless communications network, said model carrying out the steps of the method for determining such an allocation of claim 1.

13. A method of managing interference of claim 7 wherein the radius l and the allocation of channels to server groups are determined so that the inner and outer server groups of a cell experience the same blocking rate.

14. A method of managing interference of claim 8 wherein the radius l and the allocation of channels to server groups are determined so that the inner and outer server groups of a cell experience the same blocking rate.

* * * * *